(12) United States Patent  (10) Patent No.: US 6,980,663 B1
Linhard  (45) Date of Patent: Dec. 27, 2005

(54) PROCESS AND DEVICE FOR COMPENSATING FOR SIGNAL LOSS

(75) Inventor: Klaus Linhard, Schelklingen (DE)

(73) Assignee: DaimlerChrysler AG, (DE)

( * ) Notice: Subject to any disclaimer, the term of this patent is extended or adjusted under 35 U.S.C. 154(b) by 436 days.

(21) Appl. No.: 09/638,499

(22) Filed: Aug. 15, 2000

(30) Foreign Application Priority Data

Aug. 16, 1999 (DE) ................................ 199 38 158

(51) Int. Cl.[7] .............................................. H04B 1/00
(52) U.S. Cl. .............................. 381/86; 381/77; 381/93
(58) Field of Search ............................. 381/86, 83, 93, 381/71.1–71.12

(56) References Cited

U.S. PATENT DOCUMENTS

| | | | | |
|---|---|---|---|---|
| 4,593,404 A | * | 6/1986 | Bolin | 381/82 |
| 4,837,829 A | * | 6/1989 | Lobb | 381/83 |
| 4,965,833 A | * | 10/1990 | McGregor et al. | 381/83 |
| 5,185,803 A | * | 2/1993 | Moyski et al. | 381/86 |
| 5,204,971 A | * | 4/1993 | Takahashi et al. | 455/185.1 |
| 5,602,928 A | * | 2/1997 | Eriksson et al. | 381/71.4 |
| 5,815,580 A | * | 9/1998 | Craven et al. | 381/58 |
| 6,363,156 B1 | * | 3/2002 | Roddy | 381/86 |
| 6,535,609 B1 | * | 3/2003 | Finn et al. | 381/86 |

FOREIGN PATENT DOCUMENTS

| | | | | |
|---|---|---|---|---|
| DE | DE 43 08 398 A1 | 9/1993 | | G10K 11/16 |
| EP | EP 0 903 726 A2 | 9/1998 | | G10K 11/178 |

OTHER PUBLICATIONS

Garcia-Bonito, Jr., et al.; Generation of zones of quiet using a virtual microphone arrangement; J. Acoust. Soc. Am 101(6), Jun. 1997, pp. 3498-3516.

* cited by examiner

Primary Examiner—Brian T. Pendleton
(74) Attorney, Agent, or Firm—Pendorf & Cutliff

(57) ABSTRACT

For an especially low loss and echo free communication between several participants in a room (1) an inventive process for the compensation of losses of a signal(S) along a transmission path between at least one transmission point (6) and one receiving point (4) in a room (1) determining the transmission path of signal (S) and via the transmission paths at least one parameter of an associated transmission function will be determined, whereby via the determined parameters the signal level for a given position (P1 through P4) on the transmission path is controlled. Additionally an especially suitable device is provided for the implementation of the process.

15 Claims, 4 Drawing Sheets

|    | P1                  | P2                  | P3                     | P4                     |
|----|---------------------|---------------------|------------------------|------------------------|
| P1 | d=0<br>t=0          | d=0<br>t=0          | d=12<br>t=3 ms         | d=8<br>t=2 ms          |
| P2 | d=0<br>t=0          | d=0<br>t=0          | d=8<br>t=2 ms          | d=12<br>t=3 ms         |
| P3 | d=16<br>t=3 ms      | d=13<br>t=2 ms      | d=0<br>t=0             | d=0<br>t=0             |
| P4 | d=13<br>t=2 ms      | d=16<br>t=3 ms      | d=0<br>t=0             | d=0<br>t=0             |

*Fig. 4*

PROCESS AND DEVICE FOR COMPENSATING FOR SIGNAL LOSS

BACKGROUND OF THE INVENTION

1. Field of the Invention

The invention relates to a process for the compensation of losses of a signal along a transmission path, especially an acoustical transmission path, that is between at least one transmission point and a reception point in a room, particularly within a vehicle's interior.

2. Description of the Related Art

A similar topic is discussed in the simultaneously filed report "Kommunikationsanlage fuer Insassen in einem Fahrzeug" ("Communications' equipment for occupants in a vehicle"), the disclosed matter of this report is included herein by reference. This report has DE file number 19938171.2.

In a vehicle, e.g. in an automobile, the communications between vehicle occupants is degraded because of ambient noise. On the one hand, communications between occupants will be influenced by their seating arrangement. In that case the quality of the communication is especially poor between people sitting in the front and the back of the vehicle due to the speech direction (signal spreading) and the therefrom resulting corresponding signal loss along the transmission path. On the other hand, the communications between the occupants will be affected, for example, by road or wind noise. For improvement of the communications in the interior of the vehicle, anti-noise systems are usually used that reduce all ambient noise, especially motor noise, road noise and fan noise. To this end such anti-noise systems have a microphone, for example near the head of the occupants, that serves to acquire the wide band noise signals. The signal indicating the rotational speed of the engine can serve as an indicator of the engine noise. A loudspeaker will produce a signal that is of opposite phase to the noise signal, a so called anti-noise signal. Such an anti noise system is described, for example, in the article by Garcia-Bonito et al.: "Generation of Zones of Quiet Using a Virtual Microphone Arrangement," *Journal Acoustical Society of America*, 1, Jun. 1997, pages 3498 through 3516. A detriment to these systems is that spoken communication among the occupants between acoustically unfavorable positions in the vehicle is further substantially affected.

Additionally, modern vehicles provide a hands-free speaking device for radio telephones, that makes possible communications with a distant participants. With this device the reduction of the ambient noise, such as, for example, audio signals, road noise or fan noise, in the interior of the vehicle is also important for improved communications. Additionally compensated for by such hands-free speaking devices are acoustical and electrical echoes, which likewise substantially affect communications, that occur due to the particularly long signal delays of the telephone network. Echo cancellation is usually used for this. The use by other occupants of the vehicle of the hands-free speech feature is very restricted due to their acoustically disadvantageous position in the vehicle, since the microphone is especially oriented for the driver of the vehicle.

SUMMARY OF THE INVENTION

The invention begins with the problem of specifying a process for the compensation of signal losses over a transmission path, whereby a particularly low loss and echo free communication between participants in a room is made possible. In addition, an apparatus for the compensation of losses of a signal is provided that operates to avoid, as much as possible, a deterioration of the communication due to ambient noise and/or echoes.

The first identified problem is inventively solved by the process for compensation of signal losses over the transmission path between at least one sending and receiving location in a room, in that the transmission path of the signal is determined and at least one parameter of an associated transmission function will be ascertained from the transmission path, whereby the signal level for a given position in the transmission path will be controlled via the ascertained parameters.

The invention begins with the observation that an acoustical signal, especially a wide band speech signal, varies especially widely during its propagation in a room, especially in the interior of a vehicle. In addition, the propagation of the speech signal will be substantially affected by additional disturbance signals, such as road and wind noise, as well as through acoustical and electronic echoes caused by electrical systems. On one hand the different signal level losses over the acoustical path, as they occur in the spoken communications between occupants in the vehicle, should be compensated for. On the other hand, disturbance signals that affect the speech signal should be substantially reduced. Also to be taken into account is the transmission path between the sending and receiving point, particularly in the transmission direction. That means different levels of communication impairments occur depending upon the respective position in the room of the speaking (i.e. sending point) and listening persons (i.e. reception point). In order to avoid this as much as possible, the present process is so laid out that the losses of the signal level will be compensated differently for each arbitrary position or place in a room. Additionally, the disturbance signals operating on the signal will be avoided in the compensation of the level losses. To this end a parameter of the transmission function associated with the transmission path will preferably be ascertained and that parameter will be applied to the control of the signal level. The control of the signal level for a given position in the room, e.g. for the rear seat of the vehicle (i.e. receiving point) when the person in the front position is speaking (i.e. sending point), via the parameters of the transmission function associated with the transmission path, guarantees an especially good communications between all persons in the entire room.

Advantageously the transmission path will be determined as an acoustical path and/or an electrical path of the signals. Thereby the determination of the acoustical path comprises, for example, the determination of the sending point, receiving point, the type of signal transmitted between the sending point and receiving point, e.g. a speech signal or audio signal and/or the operating ambient noise of the operating transmission path, such as, e.g. acoustical echo signals, wind or road noise. Analogous thereto, by the determination of the electrical paths, the sending point and receiving point for example are determined. Additionally the operational disturbance signals of the electrical path, e.g. electrical echo signals generated by feedback, will be determined. Through the determination of the transmission path, it is guaranteed that the characteristic influences of the transmission path will be determined so that the signal level will be correspondingly controlled to compensate for these influences.

Advantageously the attenuation of the signal between the sending point and receiving point will be determined as a parameter. For example the attenuation of the signals over the entire transmission path will be determined, and there-with the difference of the signal levels between the sending point and the receiving point. Consequently, those parameters will determine, for example, that the communications between the front and the rear seats in the vehicle is especially strongly affected.

Purposefully the signal level will be amplified upon exceeding a maximum value of the attenuation of the signal level for a given position. In other words: the value of the attenuation, e.g. from receiving point (i.e. listener in the rear seat or row of the vehicle), exhibits a positive value—it really exists as an attenuation of the signals along the transmission path—then the signal to be transmitted will be amplified by an amount corresponding to the amount that attenuation. This means, for example, in the case of communications between persons in a vehicle, that the speech signal to be transmitted between persons sitting in front of and behind each other will be amplified by a larger amount than for persons sitting next to each other since there would be less attenuation between them. Especially for persons sitting in front and behind each other, the amount of amplification of the speech signals will depend upon the actively speaking person. This means that an especially large amplification of the signal results when the person in front is speaking to the person in back.

In the case of an addition of several sound components of the signal along the transmission path an especially natural and easy communication is made possible by, in the case of not exceeding a minimum value of the attenuation, attenuating the signal level for a given position. For example, in a transmission of the signal of the speaking person there can be an overlay of signals on both the acoustical and the electrical path, whereby feedback occurs, that can be particularly reliably avoided through attenuation of the corresponding signal levels.

The amplification or attenuation of the signal level as a result of a threshold value—a maximum and minimum value of attenuation—makes possible an especially simple and fast adjustment of the signal level. Through such a setting of threshold values for the amplification or attenuation it is made possible to assign different transmission paths and their underlying transmission function and associated attenuation values.

Further, the propagation time of the signals between the sending point and the receiving point will be determined as a parameter. Thereby the determination of the parameters can be carried out through reverting to a singular or periodically determined parameter for the propagation time. Especially the propagation time of the signals along the acoustical path, i.e. the propagation time of the signals along the natural sound path, will be taken into consideration.

Preferably in particular the signal along the electrical path will be temporally delayed depending upon the propagation time of the acoustical signal. This makes possible in a simple manner the transmission of the signal containing the same information at the same speed along the acoustical path as well as along the electrical path.

Preferably additional parameters will be determined that represent the acoustic and/or electrical echoes between the sending point and the receiving point. The corresponding signal level for a given point can be controlled via these parameters in dependence upon the ascertained acoustical and or electrical echoes. Preferably a further parameter will be chosen to represent the disturbance or interference signal between the sending point and the receiving point. For example a noise signal, especially a road noise signal or a wind noise signal will be determined as a disturbance signal. In both cases—echoes and/or disturbance signals—the signal level will be correspondingly controlled according by the above described parameters according to the process in dependence upon the signal type and signal intensity.

According to the size and type of the room, e.g. vehicle interior or conference room, more than one parameter will be ascertained for the control of the signal level at a given place. Purposely the values of one or more parameter for at least one predetermined transmission path are stored and will be utilized for the control of the signal level. Especially for diagnoses or analytical purposes an image of the transmissions path in the room can be constructed from the stored values that describe the signal loss at a given point in the transmissions path. The values of the parameters are preferably stored in an attenuation matrix, wherein the specific parameters are assigned to each transmission path. Consequently the complex correlation between the parameters that represent the transmission function associated with the transmission path is described in an especially simple manner. Additionally, the process is accelerated with respect to the processing of the signal.

The second identified problem is inventively solved by a device for the compensation of signal loss along the transmission path through a controller for the determination of the transmission path as well as for the determination of at least one parameter of an associated transmission function, wherein the controller is combined with at least one level meter which, in combination with at least one echo canceller, is arranged between the sending point and receiving point for the control of the signal level at a given position in the transmission path. Preferably at least one microphone serves as a transmitter at the sending point. Alternatively a microphone array can be used in place of a microphone. At the receiving point at least one loudspeaker serves the purpose of a receiver. According to the type and size of the room, further loudspeakers can also be provided. According to the room size several sending and receiving points can be combined through one or more associated loudspeaker-microphone systems.

In the preferred embodiment at least one loudspeaker-microphone system is provided for every person and position in the vehicle. The level meter serves thereby for the control of the related and/or neighboring loudspeaker-microphone system(s). For example the microphone with the highest level will be identified as the active microphone. The loudspeaker that is near the active microphone will be deactivated or strongly attenuated via the level meter. The loudspeaker of the neighboring loudspeaker-microphone system will, on the other hand, be activated, i.e. the signal originating from the active microphone will be transmitted to the neighboring loudspeaker by means of the electrical path.

A preferably controllable attenuation device is provided between the loudspeaker and the microphone for the amplification or attenuation of the signal level. The signal level for the given position is correspondingly controlled through this in dependence upon the ascertained transmission path. Consequently the transmission path characteristically variable acoustical signal level will be compensated through corresponding amplification and/or attenuation. This makes possible, in a particularly simple manner, essentially improved communication between the persons for also acoustically adverse positions.

Thereby the natural sound (acoustic signal component) will only be reinforced through the amplified sound (electrical signal component) in so far that through the addition of both signal components for the given position an especially natural and carefree communication is made possible.

According to a further advantageous embodiment a preferably adjustable timing element is provided between the sending position and the receiving position. In order to adjust the variable propagation times of the signal over the acoustical and electrical path, the signal over the electrical path will be retarded in time in dependence upon the acoustical transmission time. Consequently it is ensured that both of the signal components for a given position will be overlaid. In particular, the transmission time of the acoustical signal component will be preferably determined on the basis of the previously ascertained values.

In order to avoid acoustical and/or electrical echoes, the echo canceller is preferably realized as a digital filter, especially an FIR-filter. Such a digital frequency filter will thereby be used in combination with the level meter. Through the combination of the echo canceller with the level meter, on the one hand, an echo free communication is possible, and, on the other hand, signal losses are reliably prevented.

The advantages obtained with the invention consist especially in that through the control of the signal level for a preferred position in the transmission path through means of the parameter(s) that describe the transmission function of the signal, an impairment of the communications through ambient noise and/or echoes is reliably prevented. This is made possible in particular through the combination of a level meter and echo canceller.

BRIEF DESCRIPTION OF THE DRAWINGS

Example embodiments of the invention are further explained by means of drawings. The drawings show.

DETAILED DESCRIPTION OF THE INVENTION

Identical parts are marked in all figures with identical reference numbers.

Figure 1:
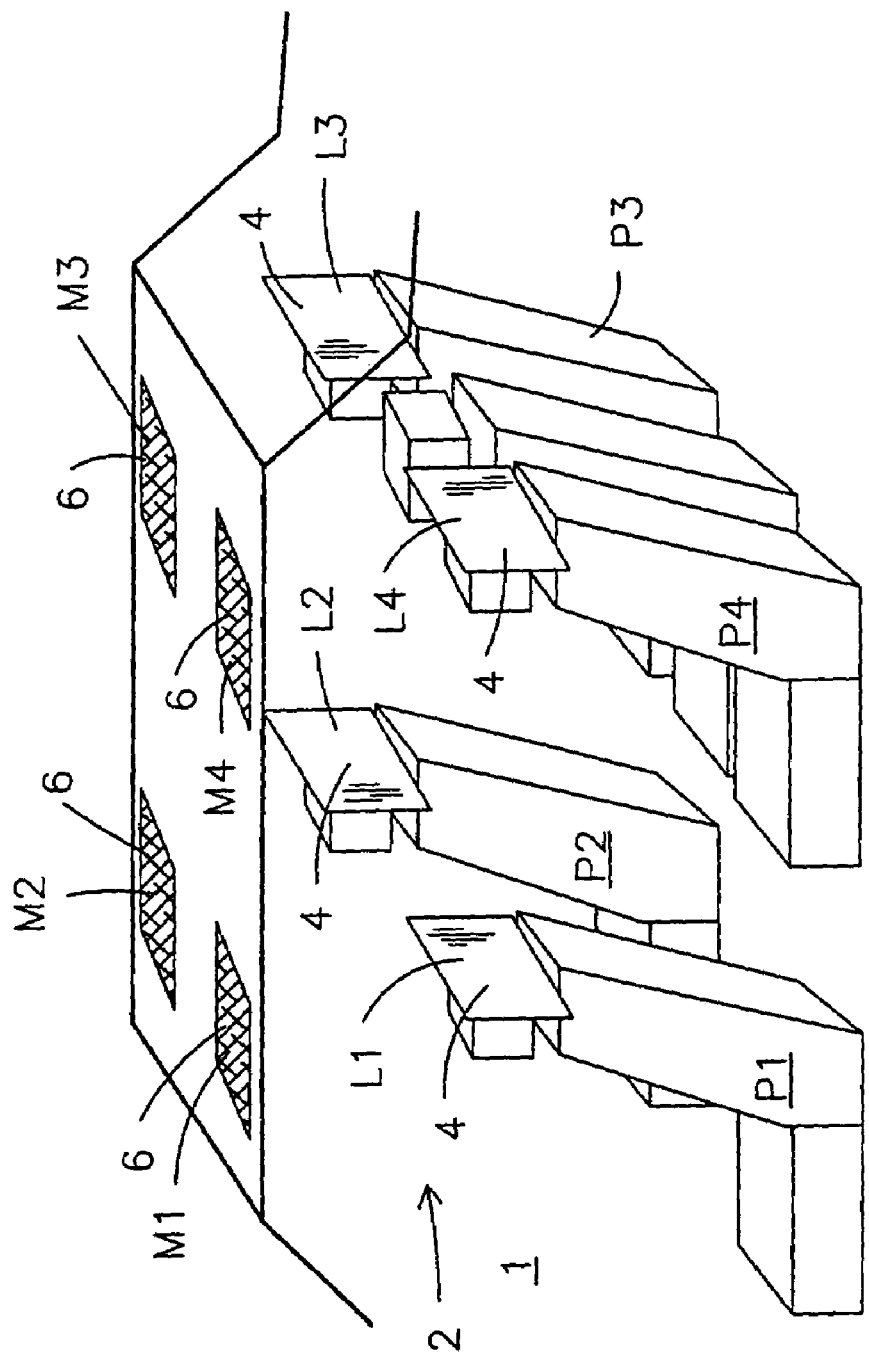
FIG. 1 schematic of a communications installation for a room, in particular for a vehicle interior, with a plurality of sending and receiving positions, FIG. 2 schematic of the communications installation with acoustical signal paths extending therein, FIG. 3 schematic of the electrical circuit of the communications installation, and FIG. 4 a table with values for parameters of different transmission paths.

In FIG. 1 a vehicle interior 1 is illustrated as a room with a communication installation 2 with four positions P1 through P4, wherein each comprise at least one receiving point 4 and at least one sending point 6. There can also be fewer or more positions P1 through P4 according to the size of the vehicle interior 1. In vehicle interior 1 at least one microphone M1 through M4 is provided as a transmitter at each sending point 6. For example a microphone array that comprises a plurality of microphones can also be used in place of the microphones M1 though M4. Similarly at least one loudspeaker L1 through L4 is provided at each receiving point 4. According to the type of embodiment several loudspeakers L1 through L4 can also be provided. Consequently each position P1 through P4 is denoted by a so-called loudspeaker-microphone system.

Figure 2:
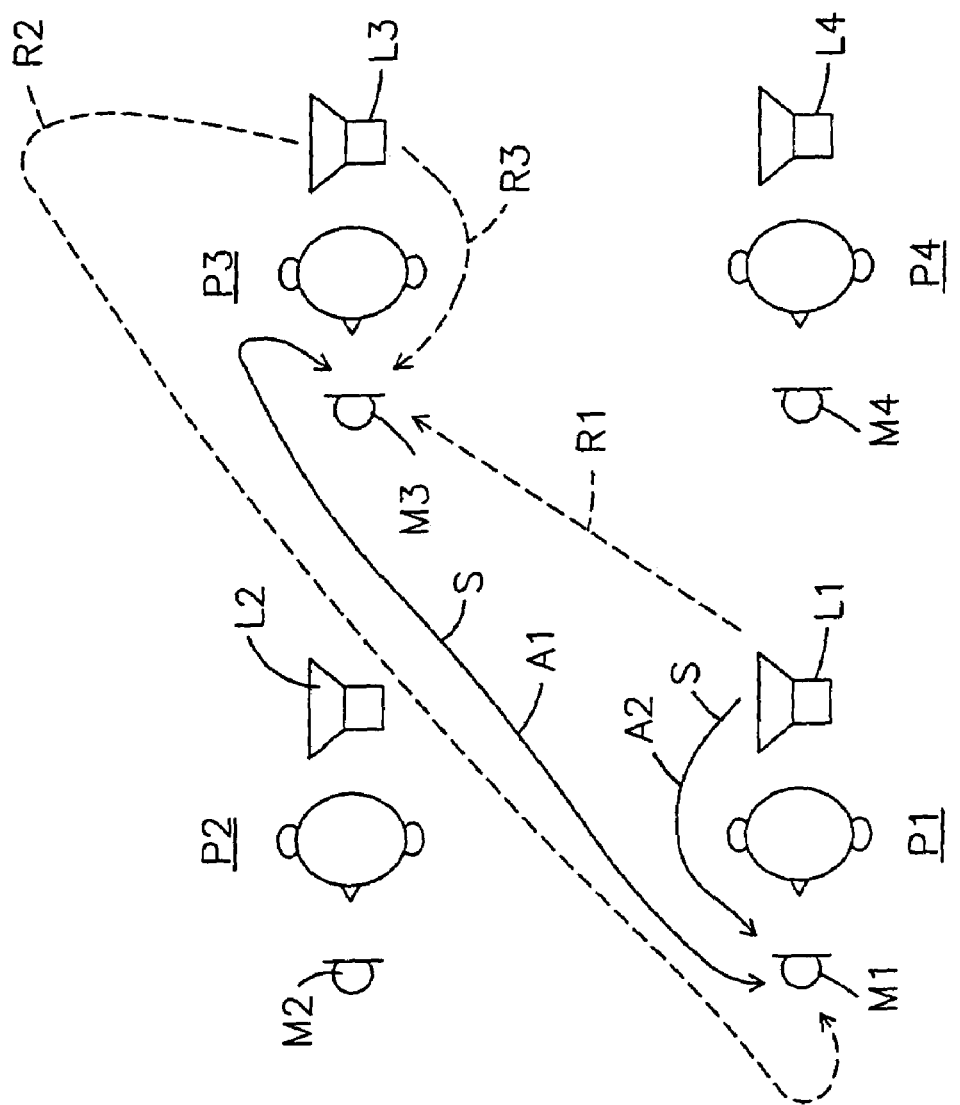

FIG. 2 shows the four positions P1 through P4 with each of the associated loudspeaker L1 through L4 and with each of the associated microphones M1 through M4. The positions P1 and P3 are occupied by persons, wherein the person in position P3 is actively speaking and the person in position P1 is listening. In operation of the communications installation 2 a transfer of the transmitted speech signal S occurs over at least one acoustical path A1 through A2. That means that the signal S arrives at the person in position P1 directly from the person in position P3 by traveling over the acoustical path A1. Simultaneously the signal S from the microphone M3 associated with position P3 will be output on loudspeaker L1 of the position P1. The person in position P1 hears, as a result, the sum of the direct sound from acoustical path A1 and the indirect sound from acoustical path A2 of the signal S.

In addition to the direct input of the signal S, microphone M3 receives the indirect sound from loudspeaker L1 over a feedback path R1. In addition, signal S' received via microphone M1 will be output on loudspeaker L3, where it arrives at microphones M1 and M3 over further feedback paths R2 and R3. Consequently several feedback couplings develop by the operation of the communications installation 2, that can lead to an instability of the communications installation and that can especially lead to loud feedback whistles.

Figure 3:
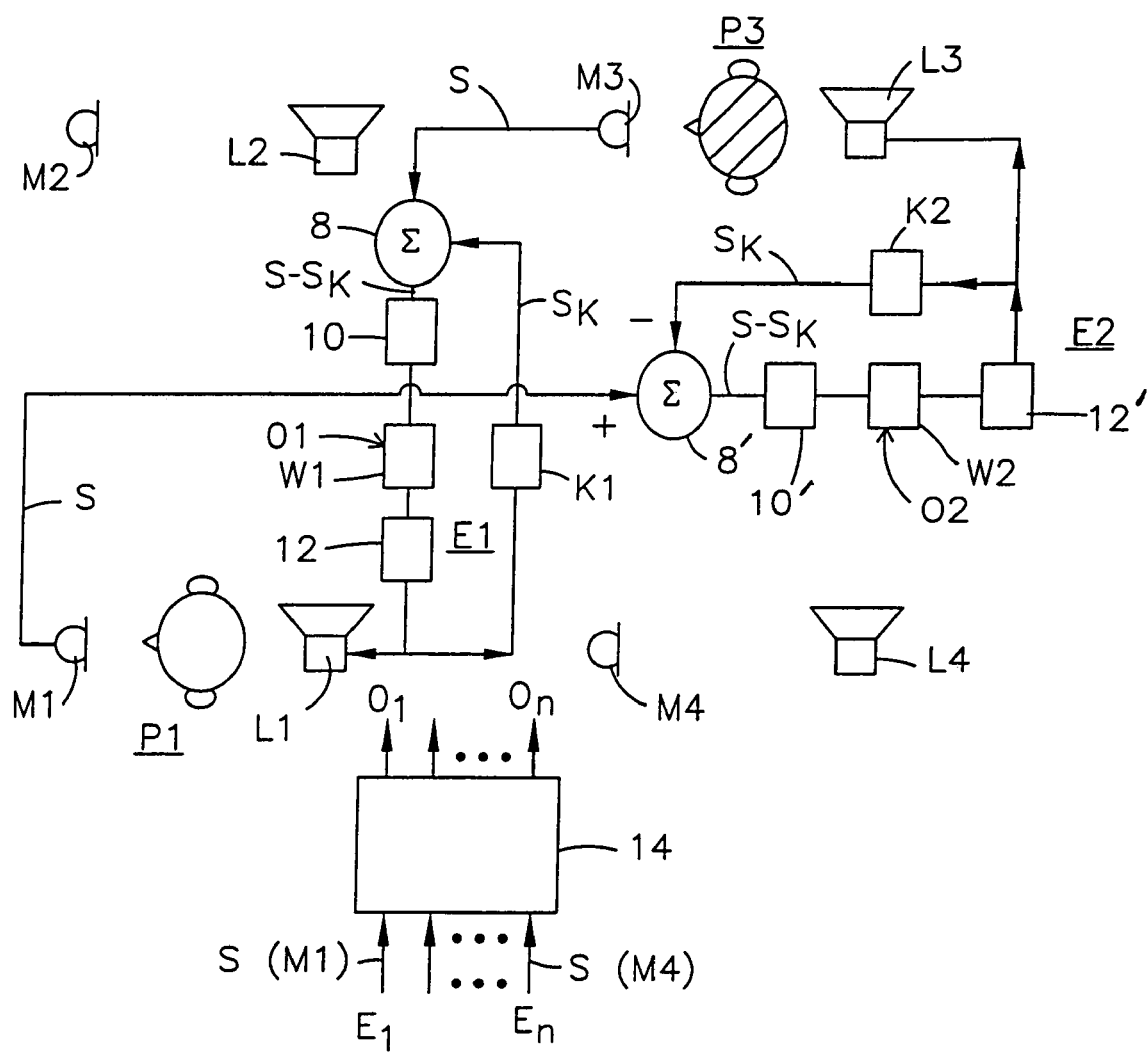

For the avoidance of such acoustical and/or electrical echoes as well as for the compensation of level losses of the signal S along the acoustical path A1, the communications installation comprises two electrical paths E1 and E2 for the signal S, as is shown in FIG. 3. The electrical path E1 runs between the microphone M3 and the loudspeaker L1 and comprise a level meter W1 and an echo canceller K1. That means that the signal S picked up by microphone M3 will be output on the loudspeaker L1 over the electrical path E1. The echo canceller K1 serves as the compensation for the acoustical and/or electrical echoes on loudspeaker L1. The echo canceller K1 is thereby connected adaptively to level meter W1.

A summing element 8 is subsequently connected to the microphone M3 which is fed with a signal $S_K$ from the echo canceller K1 with a sign inversion. The signal $S_K$ represents thereby the value of signal S that is fed back from loudspeaker L1 into microphone M3.

Additionally the electrical path E1 comprises an attenuation element 10 and a time delay element 12. The signal level is controlled via the attenuation element 10, e.g. amplified, in dependence upon the amount of the attenuation exhibited by signal S along the transmission path, in particular along the acoustical path A1 according to FIG. 2. The delay element 12, that is preferably tunable, serves to delay the signal S along the electrical path E1, whereby the delay is adjustable so that the signal S that is transferred along both the electrical path E1 and the acoustical path A1 simultaneously arrives at the position P1. Directly prior to the loudspeaker of position P1, the time delayed and amplified/attenuated signal S will be branched off into the echo canceller K1.

Similarly to the electrical path E1, the electrical path E2 likewise comprises an additional level meter W2 that is connected in combination with another echo canceller K2 as well as another summing element 8', another, in particular adjustable, attenuation element 10' and another, in particular adjustable, time delay element 12'.

In addition the communications installation 2 comprises a controller 14 that, for example, is centrally arranged in the interior of the vehicle. The controller 14 comprises a number of inputs E1 through En, through which the signal S' of each microphone M1 through M4 is routed. Further a number of outputs $O_1$ through $O_n$ are provided that serve as the control for the level meter W1 through W2.

Similarly to the communications installation 2 in FIG. 2, the positions P1 and P3 are occupied, whereby the person in position P3 actively speaks and the person in position P1 listens. By the transmission of signal S along the acoustical path A1 according to FIG. 2, the signal S will affected be the loss and/or affect of the signal level through attenuation, disturbance signals, such as road or wind noise and will be leveled out and compensated via the communications installation 2 as described below:

The active microphone M3 is determined by the controller 14 as being the microphone with the highest signal level. The loudspeaker L3 arranged near to the active microphone M3 is deactivated through the associated level meter W2 via the associated output signal on output $O_2$ of the controller 14, so that feedback from the loudspeaker L3 into the microphone M3 is certainly avoided. Alternatively the signal level is correspondingly heavily attenuated via the associated attenuation element 10', so that a feedback from loudspeaker L3 into the microphone M1 and/or M3 is likely not to occur.

In order to reinforce the signal S on the acoustical path A1 on loudspeaker L1 according to FIG. 2 the signal S on the electrical path E1 will be directly transferred to the loudspeaker L1 via the actively switched signal level W1. The signal level along the electrical path E1 will thereby be driven in dependence upon at least one of the parameters of the associated transmission function. For the equalization of the level losses a parameter will be ascertained, that represents the attenuation of the signal S between position P1 and the position P3. Preferably the attenuation of the signal S along the acoustical path A1 between the position P3 and the position P1 will be determined with the aid of a desired level. The signal level will be amplified corresponding to the desired level via the attenuation element 10. In other words, the loss in signal S along the acoustical path A1 will be compensated for by the controlled attenuation element 10 in electrical path E1. The desired level of attenuation of signal S along the acoustical path A1 in a standard automobile is, for example, approximately 12 dB. According to the type and design of the communications installation 2, the signal level can be so controlled by means of a default or a variably adjustable desired level for the affected transmission path via the attenuation element 10, that the desired level is reached. For example, upon exceeding a maximum value (i.e. maximum available attenuation) or by undershooting a minimum value (i.e. overlaying of several sound components) the signal level will, respectively, be proportionately amplified or attenuated.

Therein the acoustical (i.e. natural sound) and the electrical (i.e. amplified sound) sound components of the signal S arrive simultaneously at loudspeaker L1, the amplified signal in the electrical path E1 is delayed via the delay element 12. The time delay of the delay element 12 is thereby so chosen as to represent the propagation time of the signal along the acoustical path A1. Consequently there comes an addition of the two sound components—electrical and acoustical—at loudspeaker L1. The amplified and time delayed signal S will be fed directly from the loudspeaker L1 to the echo canceller E1. The echo canceller E1 comprises a digital filter, particularly an FIR-filter, for the compensation of the acoustical and/or electrical echoes. The signal Sk of the echo canceller E1 will be fed into the summing element 8 with a sign inversion for the cancellation of the acoustical and or electrical echoes in the signal S. In addition, the echo canceller can insert another delay element, which is not illustrated, with a propagation time equaling that of the feedback path R1 or R2 from loudspeaker L1 and L3 to microphone M3 and M1, respectively.

For an especially simple and fast compensation of the losses of signal S, each of the parameters that describe the associated transmission path, for example the attenuation and the propagation time, are inserted into an attenuation matrix according to Table 1 in FIG. 4. Therein the columns and the rows correspond to each of the positions P1 through P4, wherein the position P1 through P4 in the case of the columns are the actively speaking persons and in case of the rows are the actively listening persons. Some of the matrix elements characterize the desired level of the attenuation for the given transmission path. The others represent the propagation time and/or delay time associated with the given transmission path. The stated values are exemplary of the different transmission paths that have been observed in a standard automobile. Thereby the measured values are measured based upon the transmission function of signal S from approximately 300 Hz to approximately 2 kHz. It becomes clear, that near the position P1 through P4 the persons and their roll—speaker or listener—determines the derogation of the signal propagation. For example there is a loss of about 16 dB if the person in position P1 speaks and the person behind him in position P3 listens. When the positions P1 and P3 interchange the roll as speaker and listener, a loss of about 13 dB results. The attenuation element 10 as well as delay element 12 is adjusted depending upon the values stored in the attenuation matrix corresponding to the given transmission path. Consequently the required amplification of the signal level for the acoustical path A1 or A2 is determined especially simply and quickly, whereby the need for an especially complex or costly signal processor is avoided.

In the attenuation matrix according to Table 1, the acoustical transmission path between each laterally adjacent positions P1–P2 and P3–P4, respectively, will not be reinforced. The transmission function will be treated as adequately good for communications. Depending upon the size of the room 1, the number of positions P1 through P4, the number of microphones M1 through M4 as well as the loudspeaker L1 through L4 may vary, and accordingly, the number of possible transmission paths and matrix elements of the attenuation matrix may vary. Besides this, further parameters of the transmission function can be included in the attenuation matrix such as, for example, signal type, disturbance signal.

What is claimed is:

1. A process for the compensation of losses in an acoustic signal in a room comprising multiple positions (P1, P2, P3, P4), wherein each position comprises at least one sending point (6) and at least one receiving point (4), and wherein the losses occur between a sending point (6) of a first position and a receiving point (4) of a second position, the process comprising:

transmitting an acoustic signal (S) from the sending point (6) of the first position to the receiving point(4) of the second position via an electrical path, providing a first electro-acoustic means (M1, M2, M3, M4) for receiving the acoustic signal (S) in the vicinity of the sending point (6) of the first position, providing a second electro-acoustic means (L1, L2, L3, L4) for reproducing the acoustic signal (S) in the vicinity of the receiving point (4) of the second position, determining a parameter of the acoustic path between the sending point (6) of the first position and the receiving point(4) of the second position that is capable of being used to compensate losses due to echoes, feedback or ambient noise, and generating a compensating acoustic signal via the second electro-acoustic means (L1, L2, L3, L4) using the parameter, whereby the losses in the acoustic signal are compensated wherein the values of the parameter or of each parameter for at least one given transmission path is stored and used to control the signal level, and wherein the values of the parameter or of each parameter is stored in the form of an attenuation matrix.

2. A process according to claim 1, wherein the attenuation of the signal (S) between the sending point (6) and the receiving point (4) is determined as the parameter.

3. A process according to claim 2, wherein upon exceeding a maximum value of attenuation, the signal level for a given position (P1 through P4) is amplified.

4. A process according to claim 2, wherein upon undershooting a minimal value of attenuation, the signal level for the given position (P1 through P4) is attenuated.

5. A process according to claim 1, wherein the propagation time of the signal (S) along the acoustical path (A1 through A2) between the sending point (6) and receiving point (4) is determined as the parameter.

6. A process according to claim 5, wherein the signal (S) is delayed along the electrical path in dependence upon the propagation time of the signal (S).

7. A process according to claim 1, wherein acoustical or electrical echoes between the sending point (6) and the receiving point (4) are determined as the parameter.

8. A process according to claim 1, wherein an interference signal between the sending point (6) and the receiving point (4) is determined as the parameter.

9. A device for the compensation of losses of a signal (S) along a transmission path between at least one sending point (6) and at least one receiving point (4) in a room, comprising: a controller (14) for the determination of the transmission path as well as for the detection of at least one parameter of an associated transmission function, at least one level meter (W1 through W2) arranged in combination with at least one echo canceller (K1 through K2) between the sending point (6) and the receiving point (4) and connected to said controller for the control of the signal level at a given position (P1 through P4) along the transmission path.

10. A device according to claim 9, wherein an attenuation element (10) is provided between the sending point (6) and the receiving point (4).

11. A device according to claim 9, wherein a delay element (12) is provided between the sending point (6) and the receiving point (4).

12. A device according to claim 9, wherein the echo canceller (K1 through K2) is a digital filter, particularly an FIR-filter.

13. A device according to claim 9, wherein at least one microphone (M1 through M4) serves as a sender at the sending point (6).

14. A device according to claim 9, wherein at least one loudspeaker (L1 through L4) serves as a receiver at the receiving point (4).

15. A vehicle having a passenger space defined therein, said vehicle provided with a device for compensation of losses of a signal (S) along a transmission path between at least one sending point (6) and at least one receiving point (4) in said passenger space, said device comprising:

a controller (14) for determining the transmission path as well as for detecting at least one parameter of an associated transmission function, at least one level meter (W1 through W2) arranged in combination with at least one echo canceller (K1 through K2) between the sending point (6) and the receiving point (4) and connected to said controller for the control of the signal level at a given position (P1 through P4) along the transmission path.

* * * * *